Figure 3:
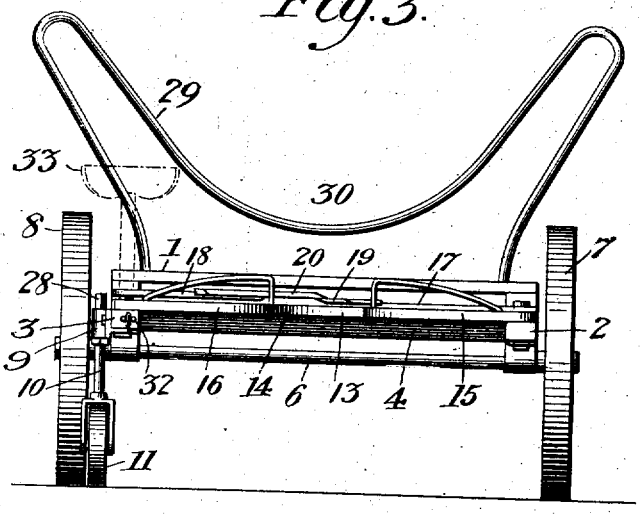

No. 12,227.
REISSUED JUNE 7, 1904.
T. BOGGS.
CORN HARVESTER.
APPLICATION FILED APR. 30, 1904.
2 SHEETS—SHEET 1.
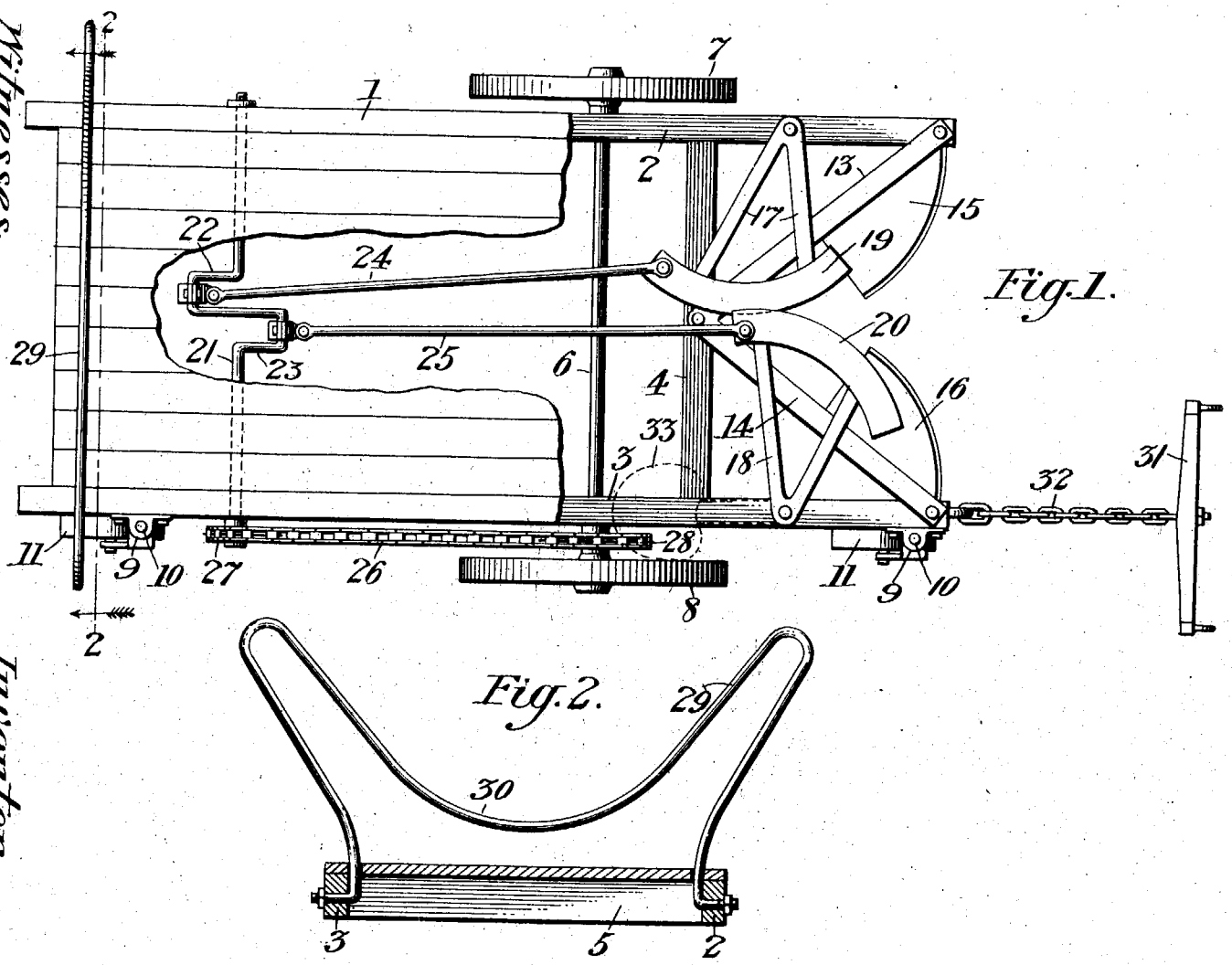
Witnesses:
E. C. Schuermann.
J. M. Kinn
Inventor:
Taylor Boggs.
By his Attys.
Pennie & Goodsborough
THE NORRIS PETERS CO., PHOTO-LITHO., WASHINGTON, D. C.

No. 12,227.

REISSUED JUNE 7, 1904.

T. BOGGS.

CORN HARVESTER.

APPLICATION FILED APR. 30, 1904.

2 SHEETS—SHEET 2.

Witnesses:
E. C. Schuermann
J. M. Thorn

Inventor:
Taylor Boggs,
By his attys.,
Lennie P. Goldsborough

THE NORRIS-PETERS CO., PHOTO-LITHO., WASHINGTON, D. C.

No. 12,227. Reissued June 7, 1904.

UNITED STATES PATENT OFFICE.

TAYLOR BOGGS, OF CHILLICOTHE, OHIO.

CORN-HARVESTER.

SPECIFICATION forming part of Reissued Letters Patent No. 12,227, dated June 7, 1904.

Original No. 755,210, dated March 22, 1904. Application for reissue filed April 30, 1904. Serial No. 205,828.

*To all whom it may concern:*

Be it known that I, TAYLOR BOGGS, a citizen of the United States, residing at Chillicothe, in the county of Ross and State of Ohio, have invented certain new and useful Improvements in Corn-Harvesters, of which the following is an application.

The invention relates to that class of corn-harvesters in which a wheel-supported frame is provided with a cutting apparatus for the purpose of severing the standing stalks; and it has for its object to provide a machine which shall possess superior advantages in point of simplicity, durability, and general efficiency and where less power is required to drive the cutting apparatus than has heretofore been necessary in machines employing reciprocating cutters.

With these ends in view the invention consists in the combination with a wheel-supported frame of a cutting apparatus comprising cutters that face toward each other from opposite sides of the line of stalks, one or both of said cutters being pivoted to oscillate in a fore-and-aft direction and the pivoted cutter or cutters being provided with means for reciprocating it or them.

The invention further consists in the improved construction, arrangement, and combination of parts, which will be hereinafter fully described, and particularly pointed out in the claims.

In the accompanying drawings a simple and preferred construction forming one embodiment of the invention is illustrated. It is to be understood, however, that departures may be made from the construction shown as to the size, proportion, and manner of assembling the parts without departing from the spirit and scope of the invention or impairing the efficiency of the machine.

In the drawings, Figure 1 is a plan view of a corn-harvester embodying the invention. Fig. 2 is a transverse sectional view taken on the line 2 2, Fig. 1. Fig. 3 is a front elevation.

Corresponding parts in the several figures are indicated by similar numerals of reference.

1 designates a rectangular frame, which is composed of right and left side beams 3 and 2, respectively, and front and rear cross-beams 4 and 5. The side beams are extended in front of the cross-beam 4, and the machine is supported upon an axle 6, which is revoluble in its bearings on the side beams and which axle carries a loose supporting-wheel 7 and a fixed drive-wheel 8. The right-hand side beam is also provided near its front and rear ends with boxings 9, in which the shanks 10 of supplemental wheels 11 are adjustably and, if preferred, revolubly mounted. It will thus be seen that the right-hand side of the machine is supported upon the driving-wheel 8 and the supplemental wheels 11, thereby facilitating the turning of the machine at the ends of the rows.

The front ends of the side beams 2 and 3 are extended forward on opposite side of the row of stalks to be cut and are connected by rearwardly-extending braces 13 and 14, respectively, with the center of the front cross-beam 4. To the braces 13 and 14 are secured guides 15 and 16, which curve inwardly and then rearwardly from the side beams and converge toward the cutting apparatus, forming a passage-way for the standing stalks and serving to guide them to the cutting apparatus as the machine advances. This cutting apparatus comprises a pair of knives 19 and 20, which are pivoted on the side beams and face toward each other from opposite sides of the line of stalks and have oppositely-beveled edges, as shown in Fig. 3, and whose edges meet and slightly overlap, as best illustrated in Fig. 1, at a point between and substantially in the transverse plane of the pivots. Both these knives are preferably pivoted, so as to oscillate in a fore-and-aft direction, and are here shown as consisting of curved blades that are secured to V-shaped frames 17 and 18, which are pivoted on the side beams sufficiently far forward to bring the transverse plane of cut in front of the cross-beam 4. These frames are here shown as (though they are not necessarily to be) provided with legs of unequal length, the rear leg being longer than the front one, and the knives are riveted or otherwise suitably secured to the inner ends of the legs, so as to slightly overlap each other, as already described. The curved edges of the cutters will therefore be disposed eccentrically to the pivots or axes upon which they swing, and consequently when either cutter moves forward its cutting edge will have a slight lateral movement and will the more surely be brought into the path of the stalks that are to be severed by the machine. This arrangement of the cutting apparatus I have found to be extremely useful and effective.

The side beams 2 and 3 support near their rear ends a transverse shaft 21, having oppositely-extending cranks 22 and 23, which are connected by pitmen 24 and 25 with the rear ends of the cutters 19 and 20. The pitmen connection between the cutters and the cranks is to be such as to provide for the necessary freedom of movement of the pitmen, which is incident to the vertical movements of the cranks of the shaft 21 and a slight lateral movement of the front ends of the pitmen where they are connected to the knives. Motion is imparted to the crank-shaft 21 by means of a chain 26, connecting a sprocket-wheel 27 upon the shaft with a sprocket-wheel 28 upon the axle or the wheel 8.

Suitably mounted upon the rear end of the frame is a cradle-like rack 29, having an upper concave surface 30 for the reception of the cornstalks after the latter have been severed by the cutting apparatus. The draft attachment (illustrated in the drawings as a swingle-tree 31) is preferably connected with the front end of the side beam 3 by means of a chain 32. The side beam 3 also supports a seat 33 for the driver.

When my improved machine is drawn over the field in operation, the draft-animal will walk between the rows of stalks or adjacent to the row that is to be cut. The standing stalks will be guided inwardly toward the meeting-point of the cutters by the guides 15 and 16 and be directed to the cutters 19 and 20, which are reciprocated in a fore-and-aft direction independently of each other and each in a direction opposite to the other, so that when one cutter is moving rearwardly the opposite cutter is moving in a forward direction, whereby the stalks which come in contact therewith will be easily and effectively severed with a draw cut resembling the motion of a scythe rather than with the chisel-like motion of reciprocating cutters moving transversely. It is to be noted of this arrangement that while the tendency is for the cutter that is moving rearward to carry the stalk with it in the direction of the opposite cutter there would be no tendency for the stalks to become jammed between the cutters inasmuch as the cutter that is simultaneously moving forward has also a shearing or draw cut in a direction opposite that of the rearwardly-moving cutter. Each cutter, therefore, has an independent cutting action apart from its coöperation with the other, and as each always presents a cutting edge which is considerably forward of the point where they meet the cutting action is gradual and easy and does not rack and jar the machine and considerably less power is required to drive the cutters than is necessary where the cutting is wholly performed by transversely-reciprocating knives. As the stalks are severed, the driver receives them with one arm and lays them back into the concave 30 of the cradle or rack 29. When a sufficient quantity has been accumulated, the machine is stopped, and the driver unloads and shocks the corn.

The machine may be drawn forward in a straight line, or it may cut around the shock or be otherwise driven in any manner that will best be suited to the work in hand.

As will be seen from the foregoing description, the construction of my improved corn-harvester is extremely simple and contains no part that is liable at any time to get out of order, and owing to the form, construction, and manner of operating the cutters above described the draft is light and the machine may be drawn by one horse and successfully operated by one man.

Having thus described my invention, I claim--

1. In a corn-harvester, the combination of cutters facing toward each other from opposite sides of the line of stalks, one of said cutters having a curved edge, and being pivoted to oscillate in a fore-and-aft direction.

2. In a corn-harvester, the combination of cutters facing toward each other from opposite sides of the line of stalks, one of said cutters being pivoted to oscillate in a fore-and-aft direction, and having a curved edge that is eccentric to its pivot.

3. In a corn-harvester, the combination of cutters facing toward each other from opposite sides of the line of stalks, one of said cutters having a curved edge and being pivoted to oscillate in a fore-and-aft direction, and provided with means for oscillating it.

4. In a corn-harvester, the combination of cutters facing toward each other from opposite sides of the line of stalks, said cutters having curved cutting edges and being pivoted to oscillate in a fore-and-aft direction.

5. In a corn-harvester, the combination of cutters facing toward each other from opposite sides of the line of stalks, said cutters having curved cutting edges and being pivoted to oscillate in a fore-and-aft direction, and provided with means for oscillating them in opposite directions.

6. In a corn-harvester, the combination of cutters pivoted on opposite sides of the stalk-line to oscillate in a fore-and-aft direction, and meeting at an intermediate point in substantially the plane of their pivots, said cutters having curved edges that are elongated so as to extend forward of the transverse plane of their meeting-point in the operation of the cutters.

7. In a corn-harvester, the combination of cutters pivoted on opposite sides of the stalk-line to oscillate in a fore-and-aft direction, and means for simultaneously oscillating the cutters in opposite directions, said cutters having edges curved to meet at a point substantially in the plane of their pivots, and elongated so as to always project forward of the transverse plane of their meeting-point in the operation of the cutters.

8. In a corn-harvester, a wheel-supported frame having forwardly-extending side pieces, curved cutters pivotally mounted upon said side pieces, a double-crank shaft, pitmen connecting the cranks of said shaft with the cutters, and means for driving the shaft from one of the wheels of the machine.

9. In a corn-harvester, a main frame, a revoluble axle supporting said frame, a loose supporting-wheel at one end of the axle, a fixed driving-wheel at the other end of the axle, supplemental wheels at the front and rear ends of the drive-wheel side of the frame, curved cutters pivoted at opposite sides of the frame so as to oscillate in a fore-and-aft direction, a transverse double-crank shaft, pitmen connecting the cranks of the shaft to the cutters, and means for rotating the shaft from the driving-wheel.

10. In a corn-harvester, a wheel-supported frame having a front cross-piece, side pieces extending forward of said cross-piece, braces connecting the ends of the side pieces with the cross-piece at the center, a cutting apparatus comprising curved forwardly-extending cutters pivotally supported on the machine-frame to oscillate in a fore-and-aft direction, guides supported by the braces and extending inwardly and rearwardly to direct the stalks centrally to the cutters, and means for reciprocating the cutters in opposite directions.

11. In a corn-harvester, the combination of cutters facing toward each other from opposite sides of the line of stalks, and mechanism for oppositely reciprocating said cutters in a fore-and-aft direction so as to have a draw-cutting action on each side of the stalks.

In testimony that I claim the foregoing as my own I have hereto affixed my signature in the presence of two witnesses.

TAYLOR BOGGS.

Witnesses:
FREDERICK B. KRAMER,
SAMUEL M. VEAIL.